United States Patent
Greiner et al.

(10) Patent No.: US 9,712,639 B2
(45) Date of Patent: Jul. 18, 2017

(54) SYSTEM AND METHOD FOR DYNAMIC PROVISIONING OF MOBILE APPLICATION CONTENT

(71) Applicant: American Express Travel Related Services Company, Inc., New York, NY (US)

(72) Inventors: Hans-Jurgen Greiner, Desert Hills, AZ (US); Mallikarj U Hiremath, Scottsdale, AZ (US); Owais Mohaideen, Phoenix, AZ (US); Edward Louis Morabito, Glendale, AZ (US); Vasif Mehmood Pasha, Scottsdale, AZ (US); Kevin H. Ringger, Surprise, AZ (US); Sathyakumar Rajaraman, Phoenix, AZ (US); Mukund Shankar Simha Raghu, Glendale, AZ (US); Subir Sud, Glendale, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 363 days.

(21) Appl. No.: 14/450,010

(22) Filed: Aug. 1, 2014

(65) Prior Publication Data

US 2016/0036895 A1 Feb. 4, 2016

(51) Int. Cl.
*H04L 29/08* (2006.01)
*G06F 17/30* (2006.01)

(52) U.S. Cl.
CPC ...... *H04L 67/306* (2013.01); *G06F 17/30864* (2013.01)

(58) Field of Classification Search
CPC . H04L 67/306; H04L 67/10; G06F 17/30864; G06F 17/30575
USPC .......................................................... 709/217
See application file for complete search history.

(56) References Cited

U.S. PATENT DOCUMENTS

| | | | |
|---|---|---|---|
| 8,615,596 B1 * | 12/2013 | Upadhyay | G06F 17/30 455/414.4 |
| 2002/0004855 A1 | 1/2002 | Cox et al. | |
| 2008/0052381 A1 * | 2/2008 | Yu | G06F 17/30905 709/220 |
| 2008/0249969 A1 | 10/2008 | Tsui et al. | |
| 2011/0177774 A1 | 7/2011 | Gupta et al. | |

(Continued)

OTHER PUBLICATIONS

International Preliminary Report on Patentability dated Feb. 16, 2016 in Application No. PCT/US2015/040424.

(Continued)

*Primary Examiner* — Tu Nguyen
(74) *Attorney, Agent, or Firm* — Snell & Wilmer L.L.P.

(57) ABSTRACT

In various embodiments, the systems, methods and computer-readable mediums (collectively "system") discussed herein may be configured to enable a single mobile application to receive dynamically customized content. The criteria and/or preferences that influence the dynamically customized content may be defined by a user and/or may be automatically detected by a user device. The criteria and/or preferences may be associated with the mobile application and/or a mobile device operating the mobile application. The criteria and/or preferences may be provided as part of a request for content to a content distribution system.

20 Claims, 2 Drawing Sheets

(56) References Cited

U.S. PATENT DOCUMENTS

2013/0007198 A1* 1/2013 Gupta .............. H04N 21/25808
                                                                        709/217
2014/0100953 A1    4/2014 Kolodziej
2014/0195354 A1    7/2014 Pokonosky

OTHER PUBLICATIONS

International Search Report and Written Opinion dated Oct. 8, 2015 in Application No. PCT/US2015/040424.

\* cited by examiner

SYSTEM AND METHOD FOR DYNAMIC PROVISIONING OF MOBILE APPLICATION CONTENT

FIELD

The present disclosure relates to systems and methods for providing content to mobile applications, and more specifically, to dynamically deploying content to mobile applications based on preferences defined by a user via a mobile device.

BACKGROUND

Current mobile application content distribution systems employ static content architectures. In order to modify content (or the form that the content is presented on the mobile application), the mobile application provider may need to distribute an update to the application. This may require that an application be updated through an application distribution system (e.g., the Apple App Store, Google Play, and/or the like).

SUMMARY

A system for dynamically deploying content to a mobile device may comprise creating content for a mobile application; defining a host preference for the application; and evaluating a device preference based on a request for mobile device application content from a mobile device. The request may include the device preference and the device preference may be defined on the mobile device. The system may also compare the device preference to the host preference and transmit a first content to the mobile device based on the device preference at least partially satisfying the host preference.

The plurality of contents for a mobile application may be associated with a unique host preference. The first content may be one of the plurality of contents. The system may further comprise selecting the first content from the plurality of contents based the comparing.

The device preference may be a language or a region. The device preference may be automatically adjusted based on a condition detected by the mobile device. The user may define the device preference via the mobile device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the systems, methods and computer-readable mediums (collectively "system") discussed herein may be configured to enable a single mobile application to receive dynamically customized content that: (1) an application may display, (2) includes destinations the application may navigate to, and/or (3) includes the language that content may be presented in, based on criteria and/or preferences. The criteria and/or preferences may be defined by a user. The criteria and/or preferences may be associated with the mobile application and/or a mobile device operating the mobile application.

In various embodiments, the mobile application may be built with a group of features. Each feature may comprise a set, collection, and/or plurality of screens and/or pages. In response to a launch, the system may inform and provide the mobile application with features it should display. For example, the system may also define the manner in which the content is displayed (e.g., the order of pages or screens that the content is displayed in), the language of any of the readable text visible in the content, and/or the like. In this regard, the system enables mobile application providers to modify what a user may experience in the mobile application and the language the application is available in, without having to re-deploy the mobile application (e.g., via a mobile application store).

Figure 1:
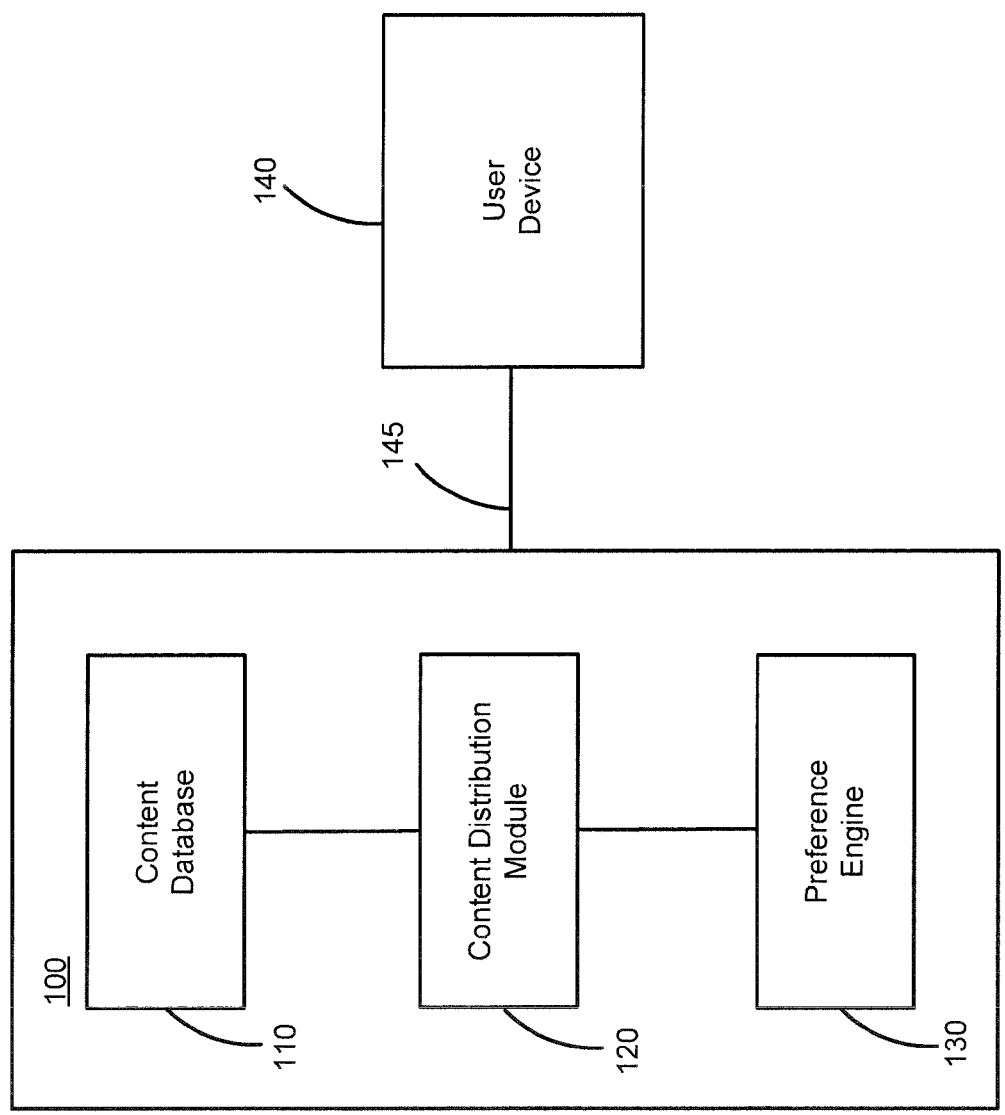
FIG. 1 illustrates exemplary content provisioning modules, in accordance with various embodiments.

In various embodiments, and with reference to FIG. 1, system 100 may comprise a content database 110, a content distribution module 120, and a preference engine 130. System 100 may also be in communication with a user device 140 via a network 145. System 100 may be any system configured to dynamically deploy content to user device 140 based on preferences associated with user device 140.

Content database 110 may be any suitable content storage structure. Content database 110 may be configured to store, house, inventory, catalog and/or otherwise keep content from one or more content providers. The content may be deployable to a user via a user device 140 through a mobile application. Content database 110 may be in electronic communication with content distribution module 120 and/or preference engine 130.

In various embodiments, content distribution module 120 may be configured to distribute content from content database 110 to user device 140 based on a request from user device 140. In this regard, the request from user device 140 may be evaluated by preference engine 130 and then communicated to content database 110 and/or content distribution module 120.

In various embodiments, preference engine 130 may be configured to evaluate a user request from user device 140. Preference engine 130 may be capable of identifying and analyzing preferences associated with a request for content from user device 140. Based on the preferences associated with the request from user device 140, preference engine 130 may compare the preference from the user device 140 (i.e., user preference) to a host preference. By identifying a host preference that corresponds with the user preference, preference engine 130 may identify the content that was requested by the user and may provide the content to the user via content distribution module 120.

Figure 2:
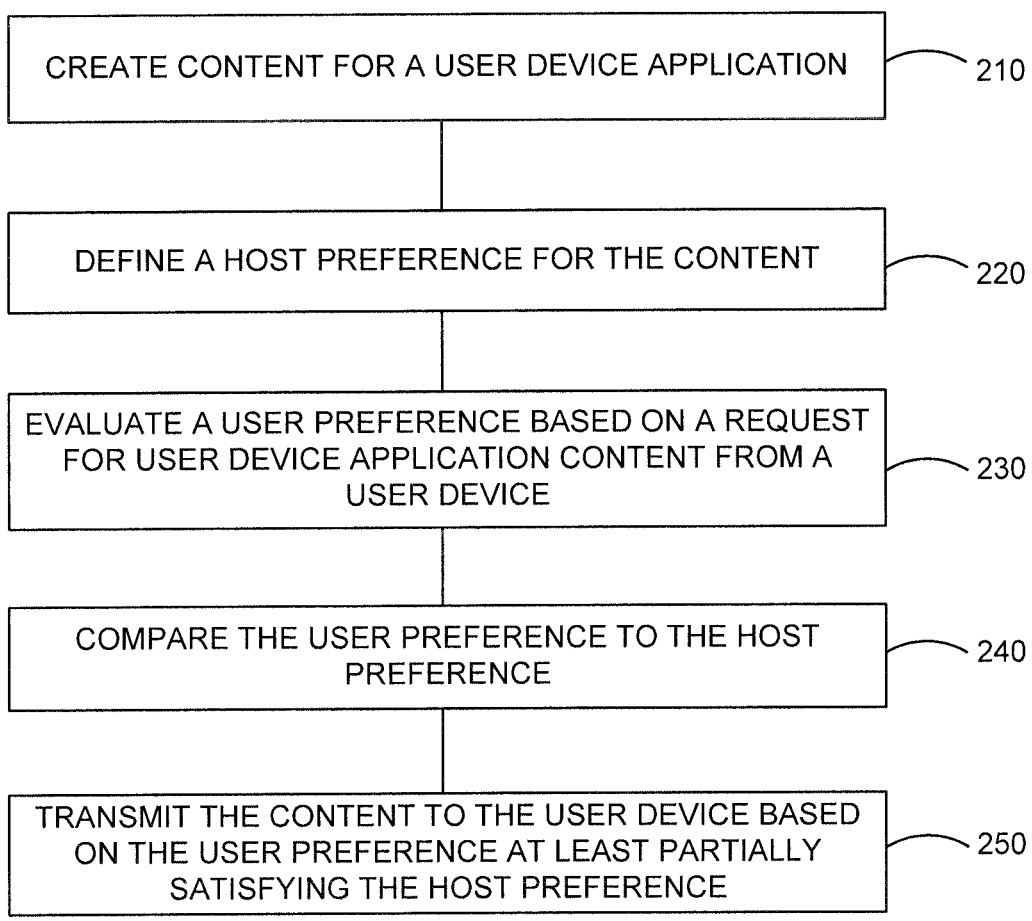
FIG. 2 is a process flow for dynamically provisioning mobile application content, in accordance with various embodiments.

In various embodiments, and with reference to FIGS. 1 and 2, system 100 may be capable of performing a method 200 for dynamically deploying content to a user device 140 through a mobile application. Content for a user device application may be created and/or provided to content database 110 (step 210). The content may be created by an administrator, a third-party (e.g. a merchant, a reward program provider, a sponsoring entity, and/or the like), a mobile application developer, and/or a third-party content generator. The creator of the content may define a host preference for the content (Step 220). The content may be segregated on content database 110. For example, content may be segregated from one another and associated with one or more host preferences, parameters, and/or attributes. In this regard, the host preference or attribute may define one or more aspects of the content. For example, a first content may be associated with a host preference that defines the language and/or the region for the content. This may define how the first content is delivered by content distribution module 120.

Preference engine 130 and/or content distribution module 120 may evaluate a user preference based on a request for user device application content from user device 140 (Step 230). For example, content distribution module 120 and/or preference engine 130 may evaluate the request for content from user device 140 and determine one or more preferences associated with the request. These preferences embedded with the request may define the nature, language, images and/or preferences associated with one or more contents available through the user device application on user device 140.

In various embodiments, user preferences may be defined via user device 140 by a user. User preference may also be automatically detected by user device 140. For example, a user may define the language for user device 140 based on a selectable menu available on user device 140. The user may also define a preference such as, for example, a language preference in the user device application operating on user device 140. In this regard, the user device application may have its own unique user preference that may be the same or different than preferences associated with and/or detected by user device 140. Preferences may also be automatically detected by user device 140. For example, user device 140 may be capable of detecting the location or region of a user. User device 140 may be configured to associate the detected information as a user preference with a request for content from user device 140. User device 140 may also be capable of detecting other environmental factors, user activities, behaviors or trends in social media, and/or the like. In this regard, user device 140 may be capable of monitoring and associating preferences or attributes about a user with a request for content that contains user preferences that influence what content is provided to the user.

In various embodiments, content distribution module 120 and/or preference engine 130 may compare the user preference to the host preference (step 240). In this regard, by at least partially correlating or matching a user preference with a host preference, content distribution module 120 and/or preference engine 130 may identify content in content database 110 that corresponds to the user preference. For example, a user preference defining a particular language may be matched with a host preference associated with that language to select content from content database 110 in the requested language. A user preference may also define a region or cultural preference that allows preference engine 130 and/or content distribution module 120 to provide content corresponding and/or tailored by the region or cultural preference.

In various embodiments, and in the context of a POS device application wherein user device 140 is a POS or a portion of a payment processing system, the preference may define a setting associated with the payment terminal display (e.g., the language, image, and/or character of the information displayed on the payment terminal). Moreover, the preference may dictate how data is handled and/or transmitted. In this regard, the preference may indicate a data security or communication protocol. This protocol may be associated with a particular region and/or country where a POS or portion of the payment processing system physically resides.

In various embodiments, content distribution module 120 may be configured to transmit the content to user device 140 based on the user preference at least partially satisfying the host preference (step 250). In this regard, where preference engine 130 and/or content distribution module 120 is able to find a correlation between the user preference supplied with the request for content from user device 140 and the host preference associated with the content stored in content database 110, the corresponding content may be delivered via content distribution module 120 over network 145 to user device 140.

In various embodiments, system 100 may be capable of storing a plurality of contents. Each of these contents may comprise or be associated with particular host preferences that can be compared to corresponding user preferences. Moreover, each of these contents may comprise a plurality of screens, displays, images and/or text.

In various embodiments, user device 140 may be any portable computing and/or point of interaction device. In this regard, user device 140 may be a portable-operating system enabled portable computing device, such as, for example, a smartphone, a tablet, a wearable device, and/or the like. User device 140 may also be a portion of a point of sale device. In this regard, user device 140 may be a payment terminal.

The user device 140 and system 100 may include or interface with any of the foregoing accounts, devices, and/or a transponder and reader in BLE communication with the transponder (which may include a fob), or communications between an initiator and a target enabled by short range communications protocols.

In various embodiments and as discussed herein, network 145 includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (e.g., point of sale device, personal digital assistant, user device (e.g., a smartphone such as, for example, iPhone®, iPad®, iPod®, Android®, Blackberry®, and/or the like), kiosk, and/or the like), online communications, satellite communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:
creating, by a computer based system, second content for a mobile application on a mobile device;
creating, by the computer based system, a second manner of displaying the second content in the mobile application;

creating, by the computer based system, a second delivery method based on the second content and based on the second manner of displaying the second content;

defining, by a computer based system, a host preference for the mobile application, wherein the host preference includes the second content, the second manner of displaying the second content and the second delivery method;

evaluating, by the computer based system, a device preference based on a request for the second content from the mobile application,
 wherein the request is sent from the mobile device to the computer based system in response to a launching of the mobile application,
 wherein the request includes the device preference,
 wherein the device preference is defined on the mobile device, and
 wherein a user creates the device preference;

comparing, by the computer based system, the device preference to the host preference;

determining, by the computer based system, that the host preference at least partially satisfies the device preference; and determining, by the computer based system, the second content from the host preference that corresponds to the device preference;

determining, by the computer based system, the second manner of displaying the second content from the host preference that corresponds to the device preference;

transmitting, by the computer based system, the second content and the second manner of displaying the second content using the second delivery method to the mobile device, wherein the mobile application modifies a first content and a first manner of displaying the first content to comply with the second content and the second manner of displaying the second content such that the second content and the second manner of display are included in the mobile application without having to re-deploy the mobile application from a mobile application store.

2. The method of claim 1, wherein the host preference defines a setting associated with a payment terminal display.

3. The method of claim 2, wherein the host preference defines a data security protocol and a communication protocol associated with a region where the mobile device is located.

4. The method of claim 3, further comprising selecting, by the computer based system, the second content from a plurality of contents based the comparing, wherein one of the plurality of contents is associated with the host preference, and wherein the second content is one of the plurality of contents.

5. The method of claim 4, wherein the device preference includes a language, a nature, an image, a preference, a navigation destination, a culture and a region.

6. The method of claim 5, wherein the device preference is automatically adjusted based on a location detected by the mobile device via a global positioning system, environmental conditions around the user, user behaviors in social media and user trends in social media.

7. The method of claim 6, wherein the user further defines the device preference via the mobile device.

8. The method of claim 7, wherein the second content is segregated from other content associated with other host preferences.

9. The method of claim 8, further comprising defining, by the computer based system, the plurality of host preferences.

10. An article of manufacture including a non-transitory, tangible computer readable storage medium having instructions stored thereon that, in response to execution by a computer based system, cause the computer based system to perform operations comprising:

creating, by the computer based system, second content for a mobile application on a mobile device;

creating, by the computer based system, a second manner of displaying the second content in the mobile application;

creating, by the computer based system, a second delivery method based on the second content and based on the second manner of displaying the second content;

defining, by a computer based system, a host preference for the mobile application, wherein the host preference includes the second content, the second manner of displaying the second content and the second delivery method;

evaluating, by the computer based system, a device preference based on a request for the second content from the mobile application,
 wherein the request is sent from the mobile device to the computer based system in response to a launching of the mobile application,
 wherein the request includes the device preference,
 wherein the device preference is defined on the mobile device, and
 wherein a user creates the device preference;

comparing, by the computer based system, the device preference to the host preference;

determining, by the computer based system, that the host preference at least partially satisfies the device preference; and determining, by the computer based system, the second content from the host preference that corresponds to the device preference;

determining, by the computer based system, the second manner of displaying the second content from the host preference that corresponds to the device preference;

transmitting, by the computer based system, the second content and the second manner of displaying the second content using the second delivery method to the mobile device, wherein the mobile application modifies a first content and a first manner of displaying the first content to comply with the second content and the second manner of displaying the second content such that the second content and the second manner of display are included in the mobile application without having to re-deploy the mobile application from a mobile application store.

11. The article of claim 10, wherein one of a plurality of contents is associated with the host preference, and wherein the first content is one of the plurality of contents.

12. The article of claim 11, further comprising selecting, by the computer based system, the second content from the plurality of contents based the comparing.

13. The article of claim 12, wherein the device preference includes a language, a nature, an image, a preference, a navigation destination, a culture and a region.

14. The article of claim 13, wherein the device preference is automatically adjusted based on a location detected by the mobile device via a global positioning system, environmental conditions around the user, user behaviors in social media and user trends in social media.

15. A system comprising:
a processor, a tangible, non-transitory memory configured to communicate with the processor, the tangible, non-transitory memory having instructions stored thereon that, in response to execution by the processor, cause the processor to perform operations comprising:

creating, by the processor, second content for a mobile application on a mobile device;

creating, by the processor, a second manner of displaying the second content in the mobile application;

creating, by the processor, a second delivery method based on the second content and based on the second manner of displaying the second content;

defining, by a processor, a host preference for the mobile application, wherein the host preference includes the second content, the second manner of displaying the second content and the second delivery method;

evaluating, by the processor, a device preference based on a request for the second content from the mobile application,
- wherein the request is sent from the mobile device to the processor in response to a launching of the mobile application,
- wherein the request includes the device preference,
- wherein the device preference is defined on the mobile device, and
- wherein a user creates the device preference;

comparing, by the processor, the device preference to the host preference;

determining, by the processor, that the host preference at least partially satisfies the device preference; and determining, by the processor, the second content from the host preference that corresponds to the device preference;

determining, by the processor, the second manner of displaying the second content from the host preference that corresponds to the device preference;

transmitting, by the processor, the second content and the second manner of displaying the second content using the second delivery method to the mobile device, wherein the mobile application modifies a first content and a first manner of displaying the first content to comply with the second content and the second manner of displaying the second content such that the second content and the second manner of display are included in the mobile application without having to re-deploy the mobile application from a mobile application store.

16. The system of claim 15, further comprising creating, by the processor, functions for the mobile application.

17. The system of claim 16, wherein the functions include the mobile application navigating to destinations.

18. The system of claim 17, further comprising selecting, by the processor, the second content from the plurality of contents based the comparing.

19. The system of claim 18, wherein the device preference includes a language, a nature, an image, a preference, a culture and a region.

20. The system of claim 19, wherein the device preference is automatically adjusted based on a location detected by the mobile device via a global positioning system, environmental conditions around the user, user behaviors in social media and user trends in social media.

\* \* \* \* \*